ETHYLENEDIAMINE TETRAACETIC ACID PERIODIDES AND COMPOSITIONS THEREOF

Leo W. Ziemlak, Pittsburgh, Pa., assignor to Chilean Nitrate Sales Corporation, New York, N. Y., a corporation of New York No Drawing. Application June 26, 1951,
Serial No. 233,711

8 Claims. (Cl. 167—17)

This invention relates to new chemical compounds having properties adapting them to bactericidal uses, and to bactericidal compositions including the same.

For the sterilization of water it is desirable to have a composition which can be prepared in a dry, stable tablet or pill form which upon dissolution in water will release iodine and sterilize the water without giving a strong offensive taste thereto by reason of end products, and make the water available for safe drinking or for laving wounded areas. Likewise, it is desirable to have a dusting powder which is stable and non-hygroscopic, and which can be employed directly upon wounds.

Proposals have been made to prepare iodine-releasing compositions, in which the iodine is not originally free but separates when the composition is brought into contact with water, either in preparing a sterilizing or sterilized liquid, or when used as a dusting powder. Many such proposals recommend the use of aromatic or other cyclic compounds, such as iodized aromatic chloramine, which upon releasing iodine has a high odor of chlorinated water and phenol: or such as morpholine periodide. A difficulty in such preparations is that the composition should be stable in moist air, yet capable of reacting quickly with water to release the iodine: these are contradictory, and some prior materials have exhibited stability in air but at the expense of timely and effective release of the iodine upon contact with water or serum, and others have effective release at the expense of storage stability wherewith some compositions are even deliquescent. Furthermore, the end products must not themselves be toxic or caustic even with accidentally acquired high dosages: and by great preference they should form only water-soluble compounds with alkaline earths such as naturally present calcium salts.

It has long been known that greater quantities of iodine can be held in solution in an iodide solution than in water alone: apparently by reason of existence of such complexes as $KI \cdot I_2$, so-called potassium periodide $KI_3$. However, such complexes are unstable.

It has now been found that a water-soluble, atmospherically-stable compound of high available iodine content, and of crystalline nature, can be prepared by reacting an alkylamine polycarboxylic acid, namely ethylenediamine tetra-acetic acid with an alkali periodide, alkaline earth periodide, or hydrogen periodide, that is, with the double salt or compound of the alkali or alkaline earth iodide, or hydrogen iodide, with iodine.

The preferred compound is obtained by treating the tetra-potassium salt of ethylenediamine tetra-acetic acid with potassium periodide, and separating the molecular complex by crystallization.

Potassium, sodium, ammonium (which herein is the chemical equivalent of an alkali metal element), calcium, magnesium, and even hydrogen periodides, or mixtures thereof, may be utilized; and the general empiric formula of the compound may be stated as $[C_{10}H_{12}O_8N_2] M_3RI_3$, in which M is a monovalent empiric substituent selected from the group consisting of hydrogen, potassium, sodium, and ammonium; and R is a divalent empiric substituent selected from the group consisting of calcium, magnesium, dihydrogen, hydrogen-potassium, hydrogen-sodium, hydrogen-ammonium, that is, compounds of the form Edta $[CaH_2I_3]$, Edta $[CaHK_2I_3]$, Edta $[CaK_3I_3]$, Edta $[H_3K_2I_3]$, Edta $[H_2K_3I_3]$, Edta $[H_2K_2NH_4I_3]$, and the like are included, where Edta is an abbreviation for the ethylenediamine tetra-acetic acid radical in the bracketed statement at the beginning of the paragraph. It will be understood that the compounds, by behavior and upon analysis, demonstrate the presence of the quadrivalent acid radical $[C_{10}H_{12}O_8N_2]$, and of three iodine atoms, together with the existence of four monovalent bonds satisfied in total or in part by hydrogen and for the rest by an alkali metal substituent, or satisfied by one bivalent alkaline earth element with the remaining two monovalencies supplied by hydrogen or an alkali metal substituent. In this connection, it is to be remembered that ultimate analyses of compositions, for determining a molecular formula of 700 or higher mass or weight units, have uncertainty as to the number of hydrogens present: and that the foregoing is stated as a type formula, rather than as meaning that the number of hydrogens present, for example in the hydrogen periodide compound of ethylenediamine tetra-acetic acid, is sixteen or seventeen.

This general empiric formula for the compound also includes complexes in which the basic component is one of the compounds of said formula, and the complex substance is one of molecular association in which there is bound to a stated compound containing ammonium as a substituent, an excess of periodide such as ammonium iodide-iodine.

EXAMPLE I

*Dipotassium salt of ethylenediamine tetra-acetic acid potassium triiodide*

13.8 grams of U. S. P. potassium carbonate was dissolved in 20 cc. of water, and to this was slowly added 14.6 grams of ethylenediamine tetra-acetic acid. The mixture was heated gently until a homogeneous solution was obtained. A second solution was prepared by dissolving 8.3 grams of U. S. P. potassium iodide in 20 cc. of water; and 14 grams of U. S. P. iodine. The second solution was slowly added, with stirring, to the first and the resulting solution heated to about 75° C. Upon cooling, a dark crystalline mass settled out almost immediately. The reaction mixture was allowed to stand for several hours in an ice bath. The crystals were then rapidly washed first with cold dilute aqueous potassium iodide, then with cold distilled water, and finally with 95 per cent ethyl alcohol. The product was then dried over phosphorus pentoxide; yield 23.5 grams.

The product is crystalline and exhibits great stability in the atmosphere. The vapor tension is very low and the odor of iodine is not discernible. When ground to a fine powder, it has a dark red-brown color. It has a solubility of 98.8 grams per liter, as measured by the quantity of iodine released when a saturated solution is formed. The aqueous solution is very similar to that of iodine in aqueous potassium iodide. Upon analyses, the empiric formula closely corresponds to $C_{10}H_{14}O_8N_2K_3I_3$ or $C_{10}H_{13}O_8N_2K_3I_3$, it being remarked that one hydrogen atom has a weight or mass of one unit in a molecule of about 788 weight or mass units. The theoretical percentage of iodine in a compound of the empiric formula $C_{10}H_{14}O_8N_2K_3I_3$ is 48.3%; and, assuming that two iodine atoms are active, the theoretical percentage of active iodine is 32.2%. The experimental value for active iodine determined by titration was 30%: but upon analysis by the Parr bomb method or by the standard U. S. P. method (iodate), the total iodine was noted as 48.8%.

The compound exhibits great stability to dry heat. A sample, which had been dried over phosphorus pentoxide, was placed in a drying oven at 100–110° C. for over 24 hours; the weight-loss was only 1.2 to 1.3 per cent. The weight-loss occurred within 16 hours of drying; there was no additional loss of weight even though the drying period was extended to a total of 25 hours. The weight-loss was apparently due to loss of moisture, for the total iodine content per mole of the triiodide was slightly higher than that found before the test. After the test, the sample could not be distinguished, by inspection, from one which had not been so treated.

The compound is non-hygroscopic in the atmosphere. A sample, which had been dried at 100 to 110° C. for 16 hours, was exposed to 65 per cent relative humidity at 70° F. for over 60 hours. The gain in weight was only 1.2 per cent, practically the weight lost on drying.

A second sample which had been dried over silica gel showed no gain in weight in the same period when exposed to 65 per cent relative humidity at 70° F.

EXAMPLE 2

The disodium salt of ethylenediamine tetra-acetic acid sodium triiodide was prepared as in Example 1, employing 10.6 grams of U. S. P. sodium carbonate and 7.5 grams of U. S. P. sodium iodide in lieu of the potassium salts; yield 32 grams. The product has essentially identical behavior and stability with that of Example 1; and its formula upon analysis is in agreement with $$C_{10}H_{14}O_8N_2Na_3I_3$$

EXAMPLE 3

The corresponding disodium salt of ethylenediamine tetra-acetic acid calcium triiodide was synthesized as in Example 2 by using 14.7 grams of U. S. P. calcium iodide in place of sodium iodide; yield 30.5 grams. Its behavior and stability are essentially the same as the potassium and sodium salts. Upon analysis, the empiric formula corresponds to $C_{10}H_{13}O_8N_2Na_2CaI_3$.

EXAMPLE 4

The disodium salt of ethylenediamine tetra-acetic acid magnesium triiodide was obtained according to Examples 2 and 3 employing 13.9 grams of U. S. P. magnesium iodide, in place of sodium and calcium iodide, respectively; yield 27.9 grams. The properties of the magnesium triiodide derivative are the same as the potassium, sodium, and calcium salts. Upon analysis, the empiric formula corresponds to $C_{10}H_{13}O_8N_2Na_2MgI_3$.

EXAMPLE 5

A number of ethylenediamine tetra-acetic acid polyiodides can be obtained by reaction of the ammonium salts of the polyamino acid with ammonium iodide and iodine. The diammonium salt of ethylenediamine tetra-acetic acid ammonium triiodide was prepared in the following manner: 5.7 grams of U. S. P. ammonium carbonate monohydrate and 14.6 grams of ethylenediamine tetra-acetic acid were dissolved in 25 cc. of water. A second solution containing 7.3 grams of U. S. P. ammonium iodide and 14 grams of U. S. P. iodine in 25 cc. of water was prepared and added to the first solution, with stirring and heating. The resulting solution was cooled and treated as before. The yield was 17.5 grams.

The product is a dark crystalline mass which upon analysis was found to contain three equivalents of iodine per mole of the diammonium salt of ethylenediamine tetra-acetic acid. Its stability is of the same high order as the aforementioned compounds.

EXAMPLE 6

It is also feasible to produce complexes having more than three equivalents of iodine per mole of the ethylenediamine tetra-acetic acid compound, by employing the holding power of excess ammonium iodide for iodine. For example, in the presence of free ammonia or at high pH values, additional iodine can be bonded with excess ammonium iodide. Thus, 11.4 grams of U. S. P ammonium carbonate monohydrate and 14.6 grams of ethylenediamine tetra-acetic acid were dissolved in 25 cc. of water, with stirring and heating. A second solution was prepared which contained 50.8 grams of U. S. P. iodine and 58 grams of U. S. P. ammonium iodide in 25 cc. of water. The latter was added to the former and the resulting solution treated as before; yield 11.3 grams.

The product is a dark crystalline solid with a total iodine content of 66 to 67 per cent. Its stability is similar to that of the other products.

EXAMPLE 7

As a further instance of the bonding effect at high pH, a polyiodide of ethylenediamine tetra-acetic acid with a total iodine content of 76 to 77 per cent was prepared according to the procedure given in Example 6 using 22.8 grams of U. S. P. ammonium carbonate monohydrate; twice the amount in Example 6; yield 8.8 grams. The product is a dark brownish powder. It is similar to the other salts in behavior and stability.

EXAMPLE 8

*Ethylenediamine tetra-acetic acid potassium triiodide*

66.4 grams of U. S. P. potassium iodide was dissolved in 200 cc. of water, and to this was added 14.6 grams of ethylenediamine tetra-acetic acid. The mixture was heated until a homogeneous solution was obtained; and then 50.8 grams of powdered U. S. P. iodine was slowly added, with stirring. The reaction mixture was heated on a steam bath until all the iodine had dissolved. Upon cooling the reaction mixture, a dark crystalline mass began to settle out almost immediately. The mixture was allowed to stand for several hours in an ice bath. The crystals were separated by filtration, and washed rapidly first with cold dilute aqueous potassium iodide, then with cold distilled water, and finally with 95 per cent ethyl alcohol. The product was then dried over phosphorus pentoxide. The yield was 33.2 grams.

The product is crystalline and exhibits great stability in the atmosphere. Its empirical formula corresponds, with the foregoing notation as to hydrogen content, to $C_{10}H_{16}O_8N_2KI_3$.

EXAMPLE 9

The same compound as in Example 8 was produced by dissolving 66.4 grams of U. S. P. potassium iodide in 200 cc. of water, warming and then adding 50.8 grams of powdered U. S. P. iodine slowly, with stirring. When all the iodine had dissolved, 14.6 grams of ethylenediamine tetra-acetic acid was added, and the mixture heated until solution was effected. Upon cooling, crystals of the periodide settled out, which were filtered off and treated as before.

EXAMPLE 10

The same compound as in Examples 8 and 9 was prepared by dissolving 13.8 grams of U. S. P. potassium carbonate in 20 cc. of water; and 14.6 grams of ethylenediamine tetra-acetic acid. In a second flask 14 grams of U. S. P. iodine and 8.3 grams of U. S. P. potassium iodide were dissolved in 20 cc. of water. The latter solution was poured into the former with stirring. The resulting solution was heated on a steam bath, and then removed and acidified with glacial acetic acid to a pH of 7.0 to 5.0. Upon cooling in an ice bath a dark crystalline mass settled out which was treated as before.

EXAMPLE 11

Ethylenediamine tetra-acetic acid sodium triiodide was obtained according to the procedure outline in Example 10 using molecular equivalents of sodium carbonate and sodium iodide in lieu of the potassium salts; yield 23 grams. The compound possesses the same stability as the other salts.

EXAMPLE 12

Ethylenediamine tetra-acetic acid calcium triiodide was synthesized as in Example 11 employing the molecular equivalent of calcium iodide in place of sodium iodide; yield 11.5 grams. The behavior and stability of the product are similar to that of the other salts.

EXAMPLE 13

Ethylenediamine tetra-acetic acid magnesium triiodide was produced according to the method given in Examples 11 and 12 by substituting the equivalent molecular amount of magnesium iodide for the sodium and calcium iodide, respectively; yield 22 grams.

EXAMPLE 14

Ethylenediamine tetra-acetic acid ammonium triiodide was prepared in like manner to that of Examples 10, 11, 12 and 13, using corresponding molecular proportions of ammonium carbonate monohydrate and ammonium iodide; yield 20 grams. Its behavior and stability are essentially the same as with the other salts.

EXAMPLE 15

In Examples 1 through 14, the carbonate may be replaced by bicarbonate, hydroxide, or like alkali, in proportions based upon the alkali metal or ammonium content.

EXAMPLE 16

Mixed salts, such as the diammonium salt of ethylenediamine tetra-acetic acid potassium triiodide, monosodium mono-potassium salt of ethylenediamine tetra-acetic acid ammonium triiodide, etc., may be prepared similarly, by introducing the corresponding alkali or alkaline earth compounds in molecular equivalent proportions at the several stages.

EXAMPLE 17

*Eethylenediamine tetra-acetic acid hydroperiodide*

20 cc. of a solution of hydriodic acid (solution contained approximately 47 per cent HI; specific gravity 1.5) and 14.6 grams of ethylenediamine tetra-acetic acid were dissolved in 100 cc. of water, with stirring and heating. 28 grams of powdered U. S. P. iodine was slowly added, with stirring, and the mixture heated until all the iodine had dissolved. Upon cooling a dark crystalline product settled out; yield 22.6 grams.

The product is fairly resistant to atmospheric moisture but lacks stability to dry heat; a sample dried for 4 hours at 100–110° C. underwent appreciable loss of iodine. Upon analysis, the compound was characterized as having the formula $C_{10}H_{17}O_8N_2I_3$.

EXAMPLE 18

The aforementioned products can be compounded in the form of a powder or tablet by the addition of a suitable carrier and dispersing agent or filler. The preferred agents are water-soluble and essentially non-hygroscopic, such as boric acid, sodium chloride, disodium dihydrogen pyrophosphate, monosodium dihydrogen phosphate, and, in general, the physiologically harmless substances used for carrying and dispersing present medicaments, and employed in the pharmaceutical art for such purposes. If the material is to be compounded in a pill or tablet form, a small amount of lubricant, such as talc, is also added.

It has been recognized that the inclusion of salt in drinking water (0.10 to 0.15 per cent) alleviates the ill effects of heat and excessive sweating. Therefore, a tablet which can be used both for the sterilization and salting of water will serve a dual purpose. The following example is illustrative of such a composition.

24.8 parts of the dipotassium salt of ethylenediamine tetra-acetic acid potassium triiodide (from Example 1), 1200 parts of sodium chloride, and 2 parts of talc were thoroughly mixed and ground to such size as to pass through an 80 mesh sieve. Tablets were prepared in the standard manner. Two 600 mg. tablets liberate approximately 8 mg. of elemental iodine, sufficient to sterilize a quart of water; the salt content of water so treated is 0.1 to 0.12 per cent.

The other compounds may be employed in like manner.

EXAMPLE 19

An antiseptic dusting powder containing as an active ingredient a periodide of ethylenediamine tetra-acetic acid, or salts thereof, can be prepared by grinding the periodide to a very fine powder. Said powder can be used as such or be diluted with a suitable carrier diluent or bulking agent such as sodium bicarbonate. The following example is illustrative.

345 parts of the dipotassium salt of ethylenediamine tetra-acetic acid potassium triiodide, and 4655 parts of sodium bicarbonate were thoroughly mixed and ground so as to pass readily through an 80 mesh sieve. Such a composition as the above has an active iodine content of 1 to 2 per cent.

The bactericidal compositions in Examples 18 and 19 exhibit stability at least equal to that of the pure periodide. Upon dissolution in water, the normally stable but bacteriocido-genetive compound undergoes decomposition whereby the end products are dissolved alkali iodide (or alkaline earth iodide or hydriodic acid), and ethylenediamine tetra-acetic acid with active iodine present in dissolved form, and its salts and derivatives as here produced, have no harmful effects upon healthy external or internal animal tissues.

Other elements will behave similarly; however, they were not included among the examples because there does not appear to be any practical use for such compounds.

The foregoing examples set out illustrative practices of making and employing compounds of the general formula; but it will be understood that such examples are not restrictive, and that the invention may be practiced and employed in other ways within the scope of the appended claims.

I claim:

1. A compound of ethylenediamine tetra-acetic acid of the general formula $[C_{10}H_{12}O_8N_2]M_3RI_3$, in which M is a monovalent empiric substituent selected from the group consisting of hydrogen, potassium, sodium and ammonium, and R is a divalent empiric substituent selected from the group consisting of calcium, magnesium, hydrogen-hydrogen, hydrogen-potassium, hydrogen-sodium, and hydrogen-ammonium.

2. Dipotassium salt of ethylenediamine tetra-acetic acid potassium triiodide.

3. Ethylenediamine tetra-acetic acid potassium triiodide.

4. A salt of ethylenediamine tetra-acetic acid potassium triiodide, in which one to two carboxyl groups thereof have had the hydrogen thereof replaced by an alkali selected from the group consisting of potassium, sodium, and ammonium.

5. A complex consisting of an ammonium salt of ethylenediamine tetra-acetic acid ammonium triiodide having bound thereto excess ammonium periodide, and having a total iodine content in excess of 66 per cent.

6. A complex consisting of an ammonium salt of ethylenediamine tetra-acetic acid ammonium triiodide having bound thereto excess ammonium periodide, and having a total iodine content in excess of 76 per cent.

7. Ethylenediamine tetra-acetic acid hydroperiodide.

8. A pharmaceutical composition comprising as a bacteriocido-genetive agent a compound as set forth in claim 1, and including a water-soluble non-hygroscopic filler: said composition being a solid and stable in atmospheric air.

References Cited in the file of this patent

UNITED STATES PATENTS

| Number | Name | Date |
|---|---|---|
| 2,281,612 | Witte | May 5, 1942 |
| 2,386,252 | Mendelsohn | Oct. 9, 1945 |
| 2,461,519 | Bersworth | Feb. 15, 1949 |
| 2,474,412 | Bersworth | June 28, 1949 |
| 2,498,174 | Morris | Feb. 21, 1950 |
| 2,517,651 | Frost | Aug. 8, 1950 |
| 2,532,392 | Bersworth | Dec. 5, 1950 |
| 2,583,559 | Frost | Jan. 29, 1952 |

OTHER REFERENCES

Gershenfeld et al., Chem. Abstracts, vol. 44, col. 11025 (1950). (Abstract of Am. J. Pharm., vol. 122, pp. 250–61, 1950.)